United States Patent [19]

Mercier et al.

[11] 3,965,064

[45] June 22, 1976

[54] PROCESS FOR THE CRYSTALLIZATION OF POLYCARBONATES AND PRODUCTS OBTAINED

[75] Inventors: Jean Mercier, Kessel-Lo; Francis Gallez, Saive; Roger Legras, Seloignes, all of Belgium

[73] Assignee: Unibra S.A., Brussels, Belgium

[22] Filed: Oct. 29, 1974

[21] Appl. No.: 519,041

Related U.S. Application Data

[63] Continuation of Ser. No. 380,218, July 18, 1973, abandoned.

[30] Foreign Application Priority Data

Feb. 28, 1972 France.......................... 72.06646
July 27, 1972 France.......................... 72.27165
Feb. 26, 1973 France.......................... 73.06643
Mar. 30, 1973 France.......................... 73.11493

[52] U.S. Cl. .................. 260/30.6 R; 260/31.2 XA; 260/47 XA; 260/DIG. 35
[51] Int. Cl.$^2$ ...................... C08K 5/09; C08K 5/50
[58] Field of Search ............ 260/30.6, 31.2, 47 XA, 260/30.6 R, 31.2 XA, DIG. 35

[56] References Cited
UNITED STATES PATENTS

| | | | |
|---|---|---|---|
| 3,186,961 | 6/1965 | Sears................................. | 260/30.4 |
| 3,306,873 | 2/1967 | Falkai ........................... | 260/47 XA |
| 3,492,268 | 1/1970 | Baker.................................. | 260/47 |
| 3,673,139 | 6/1972 | Hrach .............................. | 260/22 R |

OTHER PUBLICATIONS
Chem. Abst. 65: 15627e, 1966.
Chem. Abst. 66: 3061x.

*Primary Examiner*—Theodore Morris
*Attorney, Agent, or Firm*—Cameron, Kerkam, Sutton, Stowell & Stowell

[57] ABSTRACT

The invention concerns a process for crystallizing a polycarbonate polymer which consists in incorporating to said polycarbonate polymer a finely divided nucleating agent and/or a plasticizer for said polycarbonate polymer, and crystallizing the mixture thus obtained at a temperature higher than the vitreous transition temperature.

The semi-crystalline polymer material obtained can be reinforced by adding inorganic fibers.

24 Claims, No Drawings

PROCESS FOR THE CRYSTALLIZATION OF POLYCARBONATES AND PRODUCTS OBTAINED

This is a Continuation of application Ser. No. 380,218, filed July 18, 1973 now abandoned.

The present invention concerns the crystallization of the particular polycondensates represented by the polycarbonates, such as polycarbonates of bisphenol. This invention especially concerns a process which allows the acceleration of the crystallization of the polycabonates and it extends to the semi-crystalline materials, as obtained by this process, and to its application to the manufacture of composite products where the polymer is reinforced by inorganic substances.

The polycarbonates considered are polymers of the type of bisphenol polycarbonates, derived from di(hydroxyaryl) alkanes or cycloalkanes, which may also derive from other compounds such as di-aryl ethers, di-aryl sulphides, di-aryl sulfones, di-aryl sulphoxides, di-hydroxy naphtalen or di-hydroquinone. The polycarbonate of bisphenol-A, derived from 4,4'-dihydroxy, 2,2-diphenyl propane is a particularly advantageous specific case, to which however the invention is not limited. Other preferred polycarbonates are notably the other bisphenol polycarbonates which derive from alkanes other than propane, such as methane, ethane or butane, or which comprise alkyl substituents on the phenyl rings. But the invention extends to any other polycarbonate.

One knows already, in the case of other polymers which exist in a semi-crystalline state, especially in the case of polyamides such as "Nylon", some processes which enable to enhance the crystallization of the polymer. Such processes essentially consist in increasing the crystallization speed, starting from the melted polymer, by incorporating a small proportion of a particular organic or inorganic compound which acts as a nucleating agent. But these compounds and the processes developped for the treatment of polyamides cannot be applied in the case of polycarbonates.

The polycarbonates such as bisphenol polycarbonates constitute a category of very special materials, in that they practically exist in an amorphous form only. This amorphous form limits considerably some of the uses of these polymers and among them their uses at high temperatures. In particular, it is impossible to use bisphenol polycarbonates in conjunction with reinforcing materials such as glass fibers, at temperatures higher than the vitreous transition temperature, or glass transition temperature, while the semi-crystalline polycondensates, such as Nylon type polyamides, can be used up to temperatures which are close to the melting temperature. The absence of crystallinity precludes also the production of fibers of bisphenol polycarbonates with high tenacity.

To induce the crystallization of bisphenol polycarbonates, it has been suggested to submit the amorphous product to the action of an organic solvent in vapour phase, such as acetone. However, such a process does not enable a crystallization in mass to be obtained within a period of time consistent with the requirements of an industrial operation. Furthermore, such a process, which can only be applied to formed products, is generally accompanied by a considerable deformation and is therefore limited to surface treatments.

The present invention concerns a process which, on the contrary, allows to obtain high crystallinity degrees inside the mass. According to a first aspect of the invention, this process consists essentially in incorporating a nucleating agent into the polycarbonate polymeric material and crystallizing the mixture thus obtained at a temperature higher than the glass transition temperature. The nucleating agent is preferably stable at the processing temperature, i.e. the temperature at which the crystallization is performed, but "precursors" can also be used, such precursors being able to decompose during operation and generate the nucleating agent. Nucleating agents preferably used are comprised of inorganic salts of carbonic acid or organic acids which are stable at the processing temperature of the polycarbonate and which are used in concentrations varying preferably from 0.01 to 30% by weight. According to another aspect of the invention, the process for crystallizing polycarbonate polymer consists essentially in incorporating a plasticizer into said polycarbonate polymer, and crystallizing the mixture thus obtained at a temperature higher than its glass transition temperature. The plasticizer is advantageously used in proportions from 1 to 50% by weight, and preferably from 2.5 to 20% by weight.

Furthermore, the inventors have noticed an unexpected synergical effect between the nucleating agent and the plasticizer agent. In particular, the plasticizer alone has already a favourable action on the crystallization of the polycarbonate, but in order to obtain a sufficient increase of the crystallization rate to be consistent with an industrial operation, it may be necessary to introduce a high amount of plasticizer, which may have a prejudicial influence on the mechanical properties and, in particular, on the heat resistance of the crystalline polycarbonate obtained. This is avoided by incorporating into the polycarbonate polymer a nucleating agent together with a plasticizer.

The process according to the invention enables the industrial production of polycarbonates such as bisphenol polycarbonates, which have a high degree of crystallinity and which are suitable especially for the manufacture of composite materials reinforced with inorganic or organic materials such as fibers.

The invention also pertains to the selection of plasticizers particularly efficient in promoting the crystallization of polycarbonates such as bisphenol polycarbonates, and in particular bisphenol-A polycarbonates. The preferred plasticizers are the esters of benzene-carboxylic acids (and more specifically the esters of benzene-tricarboxylic acids), adipic acid, or phosphoric acid. Such a plasticizer enables to obtain semi-crystalline polycarbonates in the mass even if the nucleating agent is missing.

The invention will now be further described with reference to preferred embodiments and specific examples which are not limitative. Attempts will also be made to explain the action of the nucleating agent and the plasticizer upon the development of the crystallization of the polycarbonate, but the explanations given should not be used to restrict the scope of the invention.

The crystallization of polymers is only possible in a definite temperature range, which extends from the glass transition temperature to the melting temperature. However, in the case of polymers which are difficult to crystallize, the crystallinity develops only in a very narrow temperature range which is around 190°C for bisphenol-A polycarbonate, and very slowly; the time required is not compatible with the industrial requirements.

In the process according to the invention, the introduction of a plasticizer in the polycarbonate seems to have for its main effect to widen the temperature range comprised between the melting temperature and the vitreous transition temperature. Thus, the addition of 10% of plasticizer such as "Morflex 525", which is a trimellitic n-octyl and n-decyl ester, lowers the vitreous transition point of bisphenol-A polycarbonate by about 60°C and the melting point by 1°C only. There results a considerable increase of the rate of crystallization, as shown by the figures in the examples hereafter.

The polycarbonates are compatible with a great number of industrial plasticizers which can all be used in the process of the invention. Preferred examples are dibutylphtalate, dioctylphtalate, tritolylphosphate, chlorinated derivatives of diphenyl and diphenylbenzene, esters of benzene-tricarboxylic acids. One can also use polymeric plasticizers derived from low molecular weight saturated polyesters and also all other plasticizers the glass transition temperature of which is low as compared to that of the polycarbonate. One can also use as the plasticizers, solvents such as dichloromethane or acetone, which are eliminated from the material after its crystallization.

The plasticizers are introduced in the polycarbonates by any means known from those skilled in the art. For instance, they can be incorporated by dry blending the polycarbonate in powder form and adding the plasticizer by drops. One can also dissolve the plasticizer and the polycarbonate in a solvent having a low boiling point such as dioxane, and remove the solvent by sublimization under vacuum at a low temperature. Furthermore, the plasticizer can be added to the melted polymer in a mixer such as the Brabender plastograph.

The preferred plasticizers in the practice of the invention, especially when no nucleating agent is used, are the esters of benzene-carboxylic acids, preferably benzene-tricarboxylic acids, such as trimesic or trimellitic acid, the esters of phosphoric acid, the esters of adipic acid, and more specifically the esters resulting from such an acid and an alcohol having from 4 to 15, and preferably from 8 to 12 carbon atoms in its molecule. Specific examples are the esters of phtalic acid or benzene-tricarboxylic acids deriving from a straight chain alcohol comprising from 4 to 15, and preferably from 8 to 12 carbon atoms, or triarylphosphates. These plasticizers appeared quite advantageous, especially for two reasons which are, on one hand, the thermal stability of the polycarbonate and plasticizer mixtures, and, on the other hand, the accelerating effect of the plasticizer on the kinetics of the crystallization. carbonic allow the crystallization of polycarbonates to be obtained without adding a nucleating agent. But, they are also preferred plasticizers when used together with a nucleating agent. of The nucleating agent is preferably used as a solid substance in a finely divided form which is non soluble in the polycarbonate and which has a decomposition or melting temperature higher than the processing temperature, i.e higher than the temperature at which the crystallization of the plasticized or non-plasticized polycarbonate is performed.

As the nucleating agent, preferred carboni acid salts are those of the alkaline or alkaline-earth metals and still preferably sodium and calcium carbonates, advantageously used in proportions between 0.1 and 30% by weight in the mixture and preferably between 2 and 15% by weight. Salts of benzene carboxylic acids such as benzoic, phtalic, trimesic, trimellitic or tricarballylic acids, are also advantageously used, notably the salts o alkaline or alkaline-earth metals. In this case, a proportion between 0.01 and 20%, preferably a proportion between about 0.01 and 2% by weight, or preferably 0.05 and 1%, has proved most efficient. However, the process of the invention is not limited to the use of salts of benzene-carboxylic acids as the salts of organic acids, and one can also use salts of other acids comprising a benzene ring, such as benzene-sulphinic acid, or salts of aliphatic acids, preferably selected from those which are stable at the processing temperature of the polycarbonate, that is to say for example that their melting point is higher than 180°C and preferably 225°C. In the aliphatic series, preferred salts are those of acids whose molecule comprises at least two acid functions.

The nucleating agent may be incorporated in the polycarbonate by mixing as a dry-blend, either in a ball mixer or in a blender, or else by mixing in a Brabender plastograph. It shows preferably an average grain size lower than 5 microns.

All such nucleating agents are efficient to promote the crystallization of plasticized polycarbonate. The crystallization of the polycarbonate in admixture with the nucleating agent and the plasticizer may be obtained by maintaining the mixture, for a period of time of about 0.5 to 30 minutes, at a temperature between the glass transition temperature and the melting temperature, preferably between 90°C and 225°C, and preferably after heating at a temperature higher than 190°C.

However the invention also allows polycarbonates containing to be crystallized without any plasticizer and semi crustalline polycarbonate having mechanical and thermal properties which are particularly high, may then be obtained.

Thus, according to a preferred embodiment of the invention, the crystallization of a polycarbonate polymer is effected in the absence of a plasticizer by using as the nucleating agent a salt of an organic acid with a benzene ring, preferably a salt of a benzene carboxylic acid, and more particularly a salt of benzoic, phtalic, trimesic or benzene sulphinic acids.

Especially when the crystallization is performed in the absence of a plasticizer, but also when a plasticizer is used, the nucleating agent is advantageouslly selected from the salts of benzene carboxylic acids having at least one substituent on the benzene ring. Preferred nucleating agents which can be used are the salts of the benzene carboxylic acids the benzene ring of which is substituted by at least one halogen such as F, Cl and Br, a lower alkyl of alkoxy group having from 1 to 6 carbon atoms, a hydroxy or an amino group, this substituent being preferably in the para position; other preferred agents are the salts of benzene sulphinic acid, such as sodium benzene sulphinate.

According to a further feature which can advantageously be combined with the preceeding ones, the process of the invention comprises incorporating to the polymer a nucleating agent which is able to induce the crystallization of the polycarbonate at a temperature higher than 180°C and preferably between 235°C and 260°C and crystallizing the mixture thus obtained. In these various embodiments of the invention, the proportion of the nucleating agent is preferably from 0.01 to 20% by weight and more advantageously from 0.01 to 2% by weight. It is preferably used as a solid substance in a finely divided form and homogeneously distributed in the material.

The crystallization of the polycarbonate containing the nucleating agent is generally effected by heating at a temperature higher than the glass transition temperature, which is typically 145°C for non-plasticized bisphenol-A polycarbonate. It is obtained within a period of time of about 0.5 to 30 minutes, for example during the cooling of the mixture from a temperature of at least 180°C to which the mixture is previously heated, and which may vary up to about 300°C. In the presence of a plasticizer the glass transition temperature is lowered so that the crystallization may then be carried out at a temperature of about 90° to 225°C, for instance. According to a preferred embodiment, especially when the crystallization is effected without plasticizer, the mixture is heated up to the melting state, at a temperature between 235° and 260°C, and the crystallization takes place while it is cooled to ambient temperature.

Alternatively, according to another feature of the invention, the crystallization of a first batch of polycarbonate polymer containing a nucleating agent is induced and the semicrystalline material thus obtained is used as the nucleating agent for the crystallizatin of a second batch of polymer material of polycarbonate.

According to a preferred aspect of the process of the invention, the crystallization of the first batch of polycarbonate polymer is promoted by using a nucleating agent which can lead to high crystallinity degrees and preferably without the need of adding a plasticizer in the polycarbonate. In fact it is particularly advantageous, at least in the case of the first batch that the crystallization is performed without any plasticizer. The semi crystalline material thus obtained shows simultaneously a high crystallinity degree and a higher thermal stability. These properties are very useful when this material is used later as a nucleating agent, in the second stage of the process, for the crystallization of the second batch of polycarbonate polymer. This second crystallization stage can be performed with or without adding a plasticizer, depending on the required properties of the final product.

While the proportion of the nucleating agent preferably constituted by a salt of a benzene carboxylic acid, is relatively low in the first batch, for example of about 0.1% by weight, the proportion of semi crystalline material obtained in the first stage, ground in powder form, and used as the nucleating agent in the second feed, is preferably relatively higher, with a value of about 20% by weight for instance.

The invention also concerns a semi crystalline materail of polycarbonate, and more particularly of bisphenol-A polycarbonate, which shows a melting point of at least 268°C and preferably higher than 270°C and/or a degree of crystallinity higher than 30% and a melting point of at least 268°C, i.e. higher than the melting temperature polycarbonates crystallized by means of solvent vapours according to the known process. This material can be obtained by the process herein before described by correctly selecting the nature and the proportion of the nucleating agent and crystallization conditions. This material shows particularly interesting properties such as good mechanical properties at high temperatures.

The semi crystalline polycarbonates according to the invention, such as those prepared by the process described, make a highly valuable matrix for the production of composite material by adding a reinforcing material, particularly in the form of crystalline fibers, typically inorganic fibers such as glass fibers. These reinforcing fibers can be incorporated as short fibers, or long fibers, or mats or cloth, preferably in a proportion between 5 and 40% by weight of the mixture.

The examples given hereinafter are not limitative. They illustrate the invention and the properties of the obtained products.

EXAMPLE I

This example shows the properties of bisphenol-A polycarbonate crystallized by using various nucleating agents in various proportions in the mixture. These agents are used in a finely divided solid form and are homogeneously distributed in the bisphenol polycarbonate.

The nucleating agent is incorporated in the bisphenol-A polycarbonate in a powdered dry-blended form at ambient temperature. After mixing during about 5 minutes, the mixture is melted and molded at a temperature of about 250°C. The mixture is allowed to cool and the crystallization takes place during cooling.

The degrees of crystallinity are determined by the method described in J. Polym. Sci. B8, 645–650 (1970).

| | NUCLEATING AGENT | Proportions % by weight | Degree of crystallinity % | Melting Temp. °C |
|---|---|---|---|---|
| 1 | SODIUM SALTS | | | |
| | Benzoate | 0.1 | 36.4 | 295 |
| | | 1 | 41.2 | 270 |
| | Para-tert-butyl benzoate | 0.1 | 64.4 | 305 |
| | | 1 | 43.0 | 291 |
| | Para-fluoro-benzoate | 0.1 | 52.6 | 302 |
| | Para-chloro-benzoate | 0.1 | 12.5 | 293 |
| | | 1 | 65.5 | 301 |
| | Para-bromo-benzoate | 0.1 | 0.5 | 274 |
| | | 1 | 43.6 | 305 |
| | Salicylate | 0.1 | 40.1 | 296 |
| | | 1 | 51.5 | 295 |
| | Syringeate | 1 | 37.5 | 285 |
| | Para-amino-benzoate | 1 | 7.9 | 268 |
| | Benzenesulfinate | 1 | 62.3 | 295 |
| | Para-anisate | 0.1 | 21.7 | 272 |
| | | 1 | 56.3 | 301 |
| 2 | POTASSIUM SALTS | | | |
| | Benzoate | 0.1 | 50.4 | 303 |
| | Para-tert-butyl-benzoate | 0.1 | 59.2 | 303 |
| | Para-fluoro-benzoate | 0.1 | 66.5 | 308 |
| | | 1 | 32.0 | 280 |
| | Para-chloro-benzoate | 0.1 | 57.3 | 306 |
| | Para-bromo-benzoate | 0.1 | 55.5 | 308 |
| | | 1 | 41.0 | 280 |
| | Para-hydroxybenzoate | 1 | 64.6 | 307 |
| | Para-anisate | 0.1 | 46.5 | 306 |
| | Syringeate | 1 | 69.8 | 304 |
| | Gallate | 1 | 50.8 | 298 |
| 3 | OTHER SALTS | | | |
| | Lithium Benzoate | 0.1 | 6.4 | 285 |
| | Zinc Benzoate | 1 | 33.2 | 280 |

EXAMPLE II

In the same conditions as those mentioned in the example I, a mixture of bisphenol-A polycarbonate and a nucleating agent and further a plasticizer is prepared and then crystallized.

The degree of crystallinity and the melting point of the products obtained with various nucleating agents when using as the plasticizer in each case tri(n-octyl, n-decyl) trimellitate (Morflex) in a proportion of 10% by weight based upon the polycarbonate, are given hereinafter.

| NUCLEATING AGENT | Proportions % by weight | Degree of crystallinity % | Melting Temp. °C |
|---|---|---|---|
| Magnesium para-tert-butyl benzoate | 0.1 | 6.8 | 217 |
| | 1 | 16.2 | 233 |
| Calcium para-tert-butyl benzoate | 1 | 1 | 221 |
| | 10 | 4.7 | 221 |
| Barium para-tert-butyl benzoate | 10 | 7.6 | 221 |
| Aluminum para-tert-butyl benzoate | 1 | 14.6 | 223 |
| Magnesium benzoate | 0.1 | 20 | 229 |
| | 1 | 23.6 | 223 |
| Aluminium benzoate | 1 | 2.9 | 221 |
| Zinc benzoate | 0.1 | 13.8 | 229 |
| | 1 | 15.5 | 225 |

EXAMPLE III

Bisphenol-A polycarbonate is mixed in a Brabender plastograph with 0.1% by weight of sodium benzoate. The mixture is blended at a temperature between 200° and 250°C, preferably of about 225°C, during about 5 minutes.

The polymer-sodium benzoate mixture is then removed from the plastograph and it crystallizes during cooling.

The crystalline polymer thus obtained is then mixed in a ball mixer during about 15 minutes. The crystalline powder thus obtained has the following characterisics:
degree of crystallinity: about 40%
melting point of the crystals: about 300°C.

This crystallined powder can be used as a nucleating agent for crystallizing platicized or non-plasticized polycarbonate.

In this example, it is incorporated in proportion of 20% by weight, in the bisphenol-A polycarbonate which is plasticized with 10% by weight of a trimellitic ester which is tri(n-octyl, n-decyl) trimellitate known under the trade name "Morflex 525".

The mixture thus prepared is maintained at 180°C during 15 minutes and the degree of crystallinity is 25%.

EXAMPLE IV

The influence of the addition of increasing amounts of tri(n-octyl n-decyl) trimellitate, known under the trade name of Morflex, upon the crystallization rate of bisphenol-A polycarbonate, when no nucleating agent is added, is given hereunder. The different samples are melted at 270°C, in order to eliminate their thermal history.

The crystallization temperature is 190°C. The kinetics of the phase change is studied by dilatometry measurements and the crystallization is expressed in terms of the half-crystallization time.

| Plasticizer (Morflex) % by weight | Half-crystallization time (minutes) |
|---|---|
| 0 | 18 000 |
| 5 | 440 |
| 10 | 150 |

EXAMPLE V

The influence of various plasticizers upon the crystallization rate of bisphenol-A polycarbonate with 10% plasticizer is given hereunder.

The plasticizers used are the following:
tri(n-octyl n-decyl) trimellitate (Morflex)
tri(n-octyl n-decyl) trimellitate (Garbeflex)
trialphanol 79 trimellitate (Reomol ATM)
tritolylphosphate (TTP)
n-butylbenzylphtalate (Santicizer 160)
n-cyclohexyl p-toluene sulfonamide (Santicizer 1-H)
polychlorinated polyphenyl (Aroclor 1254)
The crystallization temperature is 180°C.

| Plasticizer | Origin | 1° | 2° | 3° |
|---|---|---|---|---|
| Morflex 525 | Pfizer | −75 | 90 | 150 |
| Garbeflex TM 18 | Melle Bezon | −65 | 100 | 270 |
| Reomol ATM | Geigy | −74 | 95 | 320 |
| TTP | Schuchardt | −54 | 93 | 700 |
| Santicizer 160 | Monsanto | −55 | 100 | 700 |
| Santicizer 1-H | Monsanto | −40 | 108 | 2 000 |
| Aroclor 1254 | Monsanto | −90 | 120 | 4 000 |

1° : vitreous transition temperature of the plasticizer (°C)
2° : vitreous transition temperature of a mixture of 10% plasticizer with the polycarbonate (°C)
3° : half-crystallization time (minutes).

EXAMPLE VI

The half-crystallization time of bisphenol-A polycarbonate plastified by 10% by weight of various esters of trimellitic acid has been determined, using operating conditions similar to those described in Examples IV and V. The results obtained are as follows:

| Esters of trimellitic acid | Half-crystallization time (minutes) |
|---|---|
| Methyl trimellitate | 1 500 |
| Propyl trimellitate | 1 500 |
| Butyl trimellitate | 750 |
| Hexyl trimellitate | 650 |
| Octyl trimellitate | 600 |
| Nonyl trimellitate | 85 |
| Decyl trimellitate | 100 |
| Undecyl trimellitate | 70 |
| Dodecyl trimellitate | 230 |
| Tridecyl trimellitate | 160 |

EXAMPLE VII

In the same conditions as hereinbefore mentioned, particularly in the example IV, the half-crystallization time of the bisphenol-A polycarbonate admixed with various plasticizers added in proportion of 10% by weight to the polycarbonate, is measured.

The trimesates are able to induce, as do the trimellitates, the crystallization of the polycarbonate within relatively short periods of time. The esters which derive from linear alcohols having 9, or 10, or 11 carbon atoms are particularly interesting. Thus the $C_9$ ester of the trimesic acid induces the crystallization with a half-crystallization time of 100 minutes.

The esters of phtalic acid are also highly efficient. The dinonyl-phtalate gives a half-crystallization time of 90 minutes and the 2-ethyl hexyl isodecyl phtalate gives the same. The best results have been obtained with alkyl aryl phtalates, butyl benzyl phtalate and butyl phtalyl butyl glycolate. In this case also, it is preferred to use a phtalate deriving from a straight-chain alcohol the molecule of which comprises 9, 10 or 11 carbon atoms.

The table below gives the results obtained with various trimesates or phtalates and also with an adipate and a triaryl phosphate.

| Plasticizer | Origin | Half-crystallization time (minutes) |
| --- | --- | --- |
| C₉ trimesate | | 100 |
| Dinonyl phtalate | Reomol DNP, Geigy | 90 |
| Butyl phtalyl butyl glycolate | Reomol 4PG, Geigy | 300 |
| 2-ethyl hexyl iso-decyl phtalate | Santicizer 636, Monsanto | 90 |
| Butyl benzyl phtalate | Santicizer 100, Monsanto | 350 |
| Alkyl aryl phtalate | Santicizer 262, Monsanto | 110 |
| Alkyl aryl phtalate (modified) | Santicizer 213, Monsanto | 240 |
| Di-isodecyl adipate | Reomol DIDA, Geigy | 200 |
| Triaryl phosphate | Reofos 95, Geigy | 130 |

EXAMPLE VIII

This example describes preferred procedures for the preparation of a polycarbonate polymeric material and for its crystallization, according to the invention.

First procedure: incorporation in a Brabender plastograph.

Bisphenol-A polycarbonate is introduced in the apparatus at a temperature of at least 90°C. Then the plasticizer is incorporated by drops and then the nucleating agent powder is added. Blending is carried on in a nitrogen atmosphere for a time period of 0.5 to 30 minutes and preferably about 15 minutes.

The crystallization step is performed while the article is being moulded by maintaining it at a temperature between 90°C and 225°C, and preferably about 140°–200°C, for a period of time of about 15 minutes.

The addition of glass fibers is also effected in the Brabender mixer if such glass fibers are used as fibers, and while moulding if they are used as a mat or a cloth. The inorganic fraction varies between 5 to 40% by weight.

Second procedure: Dry-blend incorporation.

The incorporation of the nucleating agent and the plasticizer is effected in the same way as in the first procedure, but in the dry powder of bisphenol-A polycarbonate, at room temperature, in a mixer (capacity: 1 liter, rotating speed: 12,000 rpm).

The mixture is melted at a temperature between 225° and 250°C, then formed in the moulds and cooled. The crystallization is obtained as above while cooling.

The adjunction of glass fibers is effected either in the mixer or while moulding as in the first procedure.

Third procedure: Lyophilization followed by dry blending.

The bisphenol-A polycarbonate and the plasticizer are dissolved in a solvent with a low boiling point such as dioxane. The solvent is removed by sublimization under vacuum at a low temperature.

The polymer and plasticizer mixture is then dried for one night at 120°C under vacuum. Then the nucleating agent is added to this mixture in a ball grinder during a period of about 15 minutes.

The melting and crystallizing step and the adjunction of glass fibers are carried out as in the preceding procedure.

EXAMPLE IX

The synergic effect obtained when using both a plasticizer and a nucleating agent is clearly demonstrated hereunder.

Using a mixture where the finely divided nucleating agent and the plasticizer are uniformly distributed in melted bisphenol-A polycarbonate, the samples are moulded at 225°C, cooled, and then heated at 180°C for 15 minutes. The crystallinity degree was measured by differential microcalorimetry (D.S.C.), assuming a melting enthalpy of the crystal of 26 Kcal/g. and according to the method described in J. Polym. Sci. B,8,695(1970).

| Mixture (by weight) | Crystallinity degree (%) |
| --- | --- |
| Polycarbonate of bisphenol-A + 10% Morflex + 1% Na₂CO₃ | 26.4 |
| Polycarbonate of bisphenol-A + 1% Na₂CO₃ | negligible |
| Polycarbonate of bisphenol-A + 10% tritolylphosphate + 0.05% sodium benzoate | 12 |
| Polycarbonate of bisphenol-A + 10% n-butylbenzylphtalate + 0.05% sodium benzoate | 41 |

EXAMPLE X

The influence of the grain size of the nucleating agents upon the crystallization rate of bisphenol-A polycarbonate plasticized with 10% Morflex by weight is given below.

The samples are moulded at 225°C and then heated at 180°C during 15 minutes. The nucleating agent used is precipitated calcium carbonate, added in an amount of 10% by weight in the mixture.

| Type of nucleating agent | Average grain diameter (microns) | Crystallinity degree (%) |
| --- | --- | --- |
| Socal D | 1,25 | 2 |
| Socal P2 | 0,30 | 8 |
| Socal U1 | 0,07 | 18 |
| Socal U1 S2 | 0,07 | 19 |

EXAMPLE XI

This example refers to the influence of the variation of the nucleating agent percentage upon the crystallinity degree of bisphenol-A polycarbonate plasticized with 10% tri (n-octyl n-decyl) trimellitate by weight. The nucleating agent is that known under trade name Socal U1 S2, commercialized by Solvay & Cie (precipitated calcium carbonate with an average grain diameter of 0.07 microns).

The samples are moulded by pressing at 225°C, from a polycarbonate powder to which a nucleating agent and a plasticizer have been added, and the crystallinity degree is measured once they have been maintained at 180°C during 15 minutes.

| Socal U1 S2 (% by weight) | Crystallinity degree (%) |
| --- | --- |
| 6 | 3 |
| 8 | 5 |
| 10 | 18 |

| Socal Ul S2 (% by weight) | Crystallinity degree (%) |
|---|---|
| 15 | 18 |
| 20 | 18 |
| 30 | 18 |

EXAMPLE XII

This example gives the results of tests on the influence of various nucleating agents upon the crystallization of bisphenol-A polycarbonate, plasticized with Morflex (mixture of 90% polycarbonate and 10% Morflex 525 plasticizer).

For the purpose of comparison, negative results obtained with other compounds are also given.

| Compound | Proportion in mixture (% by weight) | Results obtained |
|---|---|---|
| Silica (Aerosil) | 10 | 0 |
| Talc (Microtalc) | 10 | 0 |
| Micronized graphite | 10 | 0 |
| Precipitated calcium carbonate Socal D (1.25 microns) | 10 | + |
| Precipitated calcium carbonate Socal P2 (0.30 microns) | 10 | + |
| Precipitated calcium carbonate Socal U1 (0.07 microns) | 10 | ++ |
| Precipitated calcium carbonate Socal U1 S2 (0.07 microns) | 10 | ++ |
| Sodium carbonate | 1 | ++ |
|  | 10 | +++ |
| Lithium carbonate | 10 | ++ |
| Strontium carbonate | 10 | ++ |
| Magnesium carbonate | 10 | ++ |
| Lead carbonate | 10 | ++ |
| Dolomite | 10 | ++ |
| Sodium benzoate | 1 | +++ |
|  | 10 | +++ |
| Lithium benzoate | 1 | + |
|  | 10 | ++ |
| Sodium phtalate | 1 | ++ |
|  | 10 | ++ |
| Sodium trimellitate | 10 | + |
| Sodium trimesate | 10 | ++ |
| Sodium cinnamate | 1 | ++ |
|  | 10 | ++ |
| Sodium oxalate | 10 | + |
| Sodium malonate | 1 | + |
|  | 10 | ++ |
| Sodium adipate | 1 | + |
|  | 10 | ++ |
| Sodium alezate | 1 | + |
|  | 10 | ++ |
| Sodium citrate | 1 | + |
|  | 10 | ++ |
| Sodium tricarballylate | 1 | ++ |
|  | 10 | ++ |

Symbols :
0 : no nucleating effect.
+ : slight nucleating effect : after 15 minutes at 180°C, the product is slightly crystalline.
++ : evidence of nucleating effect : the maximum of crystallinity percentage is obtained within 15 minutes at 180°C.
+++ : intense nucleating effect : the product is already crystalline after moulding at 225°C and cooling.

EXAMPLE XIII

Results similar to those of the previous examples are obtained when the polycarbonate of bisphenol-A having the following formula:

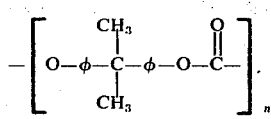

($\phi$ represents a phenyl ring)

is replaced by polycarbonate F having the following formula:

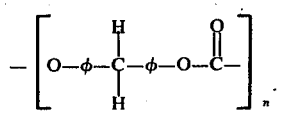

or by polycarbonate S having the following formula:

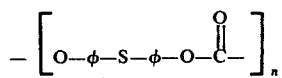

The respective temperatures of the process are approximately the same as in the previous examples.

EXAMPLE XIV

This example refers to the results of tests carried out for studying the mechanical properties of two samples of bisphenol-A polycarbonate reinforced with 20% by weight of short fibers, and especially their heat resistance.

The respective Nr 1 and Nr 2 samples are made of an amorphous polycarbonate with no plasticizer or nucleating agent and a crystalline polycarbonate as obtained according to any of the operating procedures described in Example VIII.

The plasticizer is Morflex 525 used in an amount of 10% by weight of the mixture. The nucleating agent is sodium carbonate, used in an amount of 1% by weight of the mixture.

The glass fibers are of the type 409¼ inch sold by Owens Corning and they are used in an amount of 20% by weight of the mixture.

The modulus of elasticity is measured by the ASTM D 1053 method after 10 seconds.

| Temperature | Modulus of Elasticity (Kg/cm$^2$) | |
|---|---|---|
|  | Sample Nr 1 | Sample Nr 2 |
| 25 | $2.5 \cdot 10^4$ | $2.9 \cdot 10^4$ |
| 60 | $2.5 \cdot 10^4$ | $2.3 \cdot 10^4$ |
| 100 | $2.5 \cdot 10^4$ | $1.3 \cdot 10^4$ |
| 150 | $3.6 \cdot 10^3$ | $6.7 \cdot 10^3$ |
| 160 | $3.1 \cdot 10^2$ | $6.0 \cdot 10^3$ |
| 170 | $1.1 \cdot 10^2$ | $5.5 \cdot 10^3$ |
| 180 | 10 | $4.9 \cdot 10^3$ |
| 200 | — | $1.4 \cdot 10^3$ |
| 220 | — | $3.2 \cdot 10^2$ |

EXAMPLE XV

Two samples of the final semi crystalline polycarbonate of Example III are collected and one of them is reinforced by incorporating glass fibers. Furthermore, for comparison, glass fibers are also incorporated in a sample of amorphous bisphenol-A polycarbonate without any plasticizer nor nucleating agent and in a sample of semi-crystalline polycarbonate prepared by a one-step process from a mixture of bisphenol-A polycarbonate with 10% by weight of tri (n-octyl, n-decyl) trimellitate Morflex 525 as a plasticizer and 1% by weight of sodium carbonate as a nucleating agent.

The glass fibers are of the type 405¼ inch sold by Owens-Corning and are used in a proportion of 20% by weight in the mixture in all samples which contain such fibers.

The modulus of elasticity of these samples is measured by the ASTM D 1053 method after 10 seconds. The results obtained at various temperatures are given below, in the table and relate to the four samples which have the following nature:

Sample Nr 1 a polycarbonate prepared by the process of example III and reinforced by glass fibers.
Sample Nr 2 a polycarbonate prepared by the process of example III without reinforcing agent.
Sample Nr 3 an amorphous polycarbonate reinforced by glass fibers.
Sample Nr 4 a polycarbonate crystallized by a one-step process and reinforced by glass fibers.

| Temperature (°C) | Modulus of elasticity (kg/cm²) SAMPLES | | | |
|---|---|---|---|---|
| | Nr 1 | Nr 2 | Nr 3 | Nr 4 |
| 25 | $2.9 \cdot 10^4$ | $1.3 \cdot 10^4$ | $2.5 \cdot 10^4$ | $2.9 \cdot 10^4$ |
| 40 | $2.9 \cdot 10^4$ | $1.1 \cdot 10^4$ | — | — |
| 60 | $2.6 \cdot 10^4$ | $9.5 \cdot 10^3$ | $2.5 \cdot 10^4$ | $2.3 \cdot 10^4$ |
| 80 | $1.6 \cdot 10^4$ | $6.5 \cdot 10^3$ | — | — |
| 100 | $9.3 \cdot 10^3$ | $3.8 \cdot 10^3$ | $2.5 \cdot 10^4$ | $1.3 \cdot 10^4$ |
| 120 | $5.1 \cdot 10^3$ | $2.3 \cdot 10^3$ | — | — |
| 140 | $3.2 \cdot 10^3$ | $1.7 \cdot 10^3$ | — | — |
| 150 | — | — | $3.6 \cdot 10^3$ | $6.7 \cdot 10^3$ |
| 160 | $3.2 \cdot 10^3$ | $1.5 \cdot 10^3$ | $3.1 \cdot 10^2$ | $6.0 \cdot 10^3$ |
| 170 | — | — | $1.1 \cdot 10^2$ | $5.5 \cdot 10^3$ |
| 180 | $2.4 \cdot 10^3$ | $1.2 \cdot 10^3$ | 10 | $4.9 \cdot 10^3$ |
| 200 | $1.7 \cdot 10^3$ | $9.3 \cdot 10^2$ | — | $1.4 \cdot 10^3$ |
| 220 | $7.6 \cdot 10^2$ | $2.2 \cdot 10^2$ | — | $3.2 \cdot 10^2$ |

This table shows clearly that the mechanical properties are improved by the crystallization of the polycarbonate. At high temperatures sample Nr 1 exhibits the better properties, this sample being prepared by the two-step process of the invention and reinforced by glass fibers. But these results also show that this process allows to obtain a semi crystalline polycarbonate which, even without incorporating reinforcing fibers (see sample Nr 2), already has properties close to those of the samples of semi crystalline polycarbonate which are plasticized and reinforced by glass fibers.

EXAMPLE XV

Semi crystalline polycarbonate is prepared as mentioned in example I, by inducing the crystallization of a mixture of bisphenol-A polycarbonate with 0.1% by weight of sodium para chloro benzoate without any plasticizer.

The modulus of elasticity of the semi crystalline product thus obtained is given below, depending of the temperature:

| Temperature °C | Modulus of elasticity kg/cm² |
|---|---|
| 20 | 20 000 |
| 100 | 20 000 |
| 140 | 10 000 |
| 220 | 2 000 |
| 240 | 2 500 |
| 260 | 2 000 |
| 280 | 700 |
| 290 | 250 |

These results show an excellent heat stability.

We claim:

1. A process for crystallizing a bisphenol polycarbonate polymer wherein a nucleating agent in finely divided form, having a melting point above 180°C and selected from the group consisting of metal salts of carbonic acid, metal salts of organic acids and mixtures thereof and a plasticizer are incorporated into said polycarbonate polymer and the mixture thus obtained is crystallized at a temperature higher than its glass transition temperature.

2. A process according to claim 1 wherein said polycarbonate polymer is admixed with 2.5 to 20% by weight of a plasticizer for said polycarbonate polymer selected from the group consisting of esters of benzene tricarboxylic acids.

3. A process according to claim 1 wherein said bisphenol polycarbonate polymer is admixed with 1 to 50% by weight of a plasticizer selected from the group consisting of esters of benzene-carboxylic acids, adipic acid, and phosphoric acid.

4. A process according to claim 1 wherein said organic acid is selected from the group consiting of benzene-carboxylic acids and benzene sulfinic acids.

5. A process for crystallizing a bisphenol polycarbonate polymer wherein a finely divided nucleating agent which is stable at the processing temperature and which is selected from the group consisting of the inorganic salts of carbonic acid, is incorporated into said polycarbonate material, together with 2.5 to 20% by weight of a plasticizer compatible with said polycarbonate polymer, and the mixture thus obtained is crystallized at a temperature higher than the glass transition temperature.

6. A process for crystallizing a bisphenol polycarbonate polymer wherein a finely divided nucleating agent which is selected from the group consisting of the alkaline and alkaline-earth metal carbonates, is incorporated into said polycarbonate material, together with a plasticizer selected from the group consisting of the esters of benzene-carboxylic acids, phosphoric acid and adipic acid, and the mixture thus obtained is crystallized at a temperature higher than the glass transition temperature.

7. A process according to claim 6, wherein said mixture is crystallized by maintaining it at a temperature between 90° and 225°C for 0.5 to 30 minutes.

8. A process according to claim 5, wherein the mixture is heated at a temperature from 180°C to 300°C, moulded, and is maintained during subsequent cooling at a temperature higher than 90°C for 0.5 to 30 minutes.

9. A process for crystallizing a bisphenol polycarbonate polymer wherein 0.01 to 20% by weight of a nucleating agent which is selected from the group consisting of the inorganic salts of benzene-carboxylic acids and benzene-sulfinic acids is incorporated into said polycarbonate polymer and the mixture thus obtained is crystallized at a temperature higher than its glass transition temperature.

10. A process for crystallizing a bisphenol polycarbonate polymer wherein a nucleating agent which is selected from the group consisting of inorganic salts of benzene-carboxylic acids is incorporated into said polycarbonate polymer, to the exclusion of a plasticizer, and the mixture thus obtained is crystallized at a temperature higher than its glass transition temperature.

11. A process for crystallizing a bisphenol polycarbonate polymer wherein a finely divided nucleating agent which is selected from the group consisting of the alkaline and alkaline-earth metal salts of a benzene-carboxylic acid is incorporated in said polycarbonate polymer and the mixture thus obtained is crystallized at a temperature higher than the glass transition temperature.

12. A process according to claim 11, wherein the proportion of said nucleating agent in said mixture is between 0.01 and 2% by weight.

13. A process for crystallizing a bisphenol polycarbonate polymer wherein a nucleating agent which is selected from the inorganic salts of benzene-carboxylic acids is incorporated into said polymer, in a proportion from 0.01 to 20% by weight, and the mixture thus obtained is heated to the melted phase, moulted and cooled to a temperature lower than the glass transition temperature.

14. A process according to claim 13, wherein said nucleating agent is an inorganic salt of a benzene-carboxylic acid comprising on the benzene ring at least one atom, alkyl or alcoxy radical with 1 to 6 carbon atoms, oxhydryl radical or amino radical.

15. A process according to claim 13 wherein the proportion of said nucleating agent in said mixture is between 0.05 and 1% by weight.

16. A process for crystallizing a bisphenol polycarbonate polymer, wherein a finely divided nucleating agent which is selected from the group consisting of the inorganic salts of oxalic, malonic, adipic, citric, tricarballylic, azelic, and cinnamic acids is incorporated into said polycarbonate material, together with a plasticizer compatible with said polycarbonate polymer, and the mixture thus obtained is crystallized at a temperature higher than the glass transition temperature.

17. A moulding composition comprising a bisphenol polycarbonate polymer, a plasticizer for said polymer and a nucleating agent in finely divided form, having a melting point above 180°C and selected from the group consisting of metal salts of carbonic acid, metal salts of organic acids and mixtures thereof.

18. A moulding composition comprising a bisphenol polycarbonate polymer, from 1 to 50% by weight of a plasticizer selected from the group consisting of esters of benzene-carboxylic acids, phosphoric acid, and adipic acid, and from 0.01 to 20% by weight of a nucleating agent selected from the group consisting of the inorganic salts of carbonic acid, benzene-carboxylic acids, benzene-sulfinic acids, oxalic, malonic, adipic, citric, tricarballylic, azelic, and cinnemic acids.

19. A moulding composition comprising a bisphenol polycarbonate polymer and a nucleating agent dispersed in said polymer and selected from the group consisting of inorganic salts of benzene-carboxylic acids, said nucleating agent being in a finely divided form and having a melting point above 180°C.

20. A polymer material comprising a mixture of a bisphenol polycarbonate polymer and a nucleating agent in finely divided form, having a melting point above 180°C and selected from the group consisting of the metal salts of carbonic acid, metal salts of organic acids and mixtures thereof, said mixture being in semi-crystalline form.

21. A polymer material according to claim 20 further comprising reinforcing fibers.

22. A polymer material according to claim 20 having a crystallinity ratio higher than 30% throughout the mass.

23. A polymer material according to claim 20 having a melting point higher than 268°C.

24. A polymer material comprising a mixture of a bisphenol polycarbonate polymer, a plasticizer for said polymer and a nucleating agent in finely divided form, having a melting point above 180°C and selected from the group consisting of metal salts of carbonic acid, metal salts of organic acids and mixtures thereof, said mixtures being in semi-crystalline form.

* * * * *

UNITED STATES PATENT OFFICE
CERTIFICATE OF CORRECTION

PATENT NO. : 3,965,064
DATED : June 22, 1976
INVENTOR(S) : JEAN MERCIER, FRANCIS GALLEZ and ROGER LEGRAS It is certified that error appears in the above-identified patent and that said Letters Patent are hereby corrected as shown below:

Claim 14, column 15, line 4, before "atom" insert --halogen--.

Signed and Sealed this

First Day of March 1977

[SEAL]

Attest:

RUTH C. MASON
Attesting Officer

C. MARSHALL DANN
Commissioner of Patents and Trademarks